Patented July 12, 1932

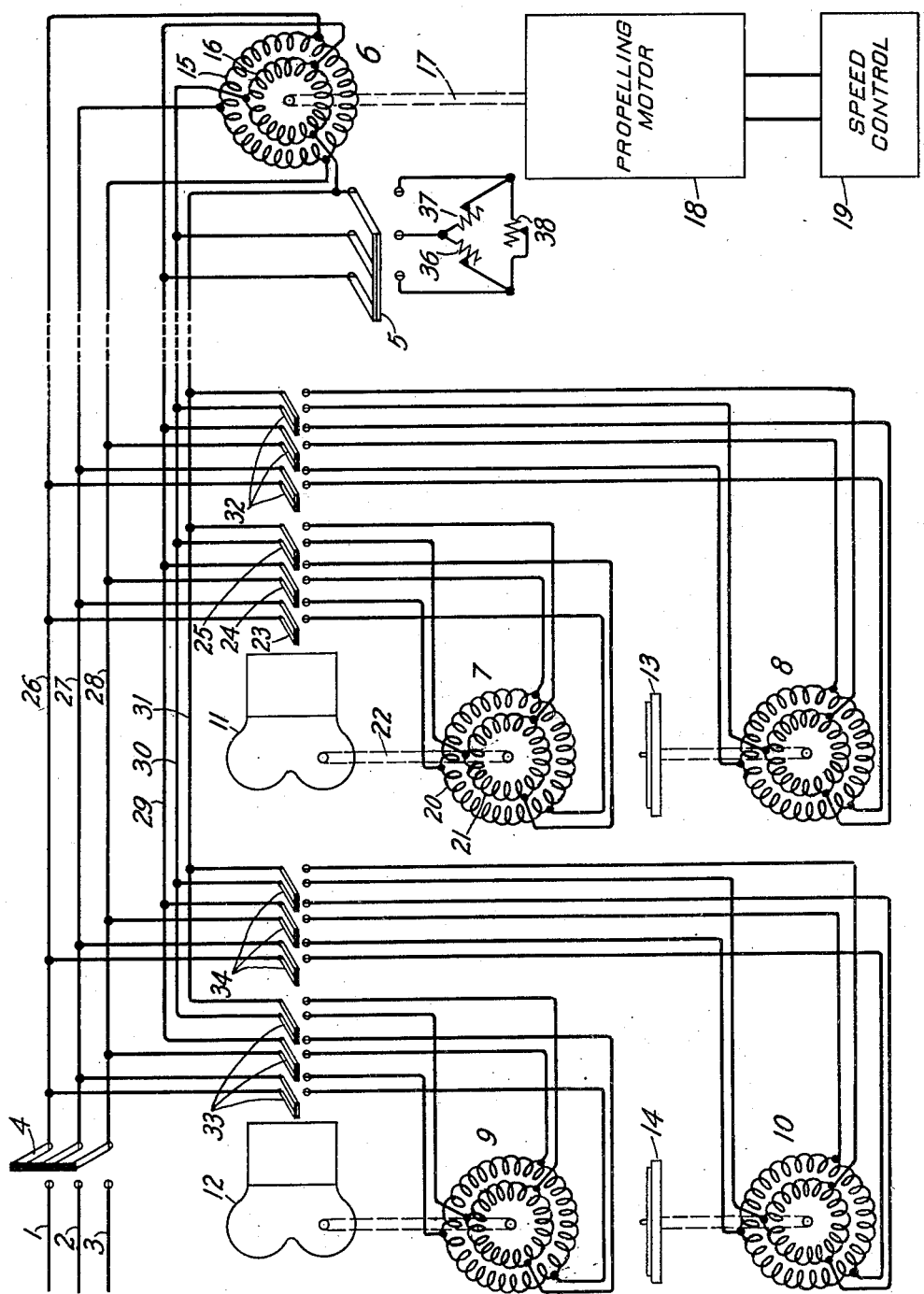

1,867,373

UNITED STATES PATENT OFFICE

EDMUND R. MORTON, OF BROOKLYN, NEW YORK, ASSIGNOR TO BELL TELEPHONE LABORATORIES, INCORPORATED, OF NEW YORK, N. Y., A CORPORATION OF NEW YORK

MOTOR CONTROL SYSTEM

Application filed September 19, 1928. Serial No. 306,821.

This invention relates to systems for operating motors in synchronism and particularly to control systems for operating a plurality of motors in synchronism and at constant speed.

One object of the invention is to provide a control system having a plurality of motors operated in synchronism at constant speed with means for carrying the load required for driving the motors in an improved manner.

Another object of the invention is to provide a motor control system of the above indicated character having a plurality of motors embodying polyphase stator and rotor windings, the stator windings being connected in parallel circuit relation to a polyphase source of current and the rotor windings being connected together in parallel circuit relation, with improved means for connecting the rotor windings together to develop torque.

In making a moving picture record simultaneously with a sound record where an operating motor is provided for the moving picture machine and a separate motor is provided for the sound recording machine, it is essential to operate the motors synchronously and at a constant speed. In the patent to C. J. A. Michalke #684,579 dated October 15, 1901 is disclosed a system wherein the stator windings of the motors are connected in parallel circuit relation to a three phase generator and the rotor windings are connected together in parallel circuit relation whereby the movement of any rotor is followed synchronously by all the other rotors. The system disclosed hereinafter is in some respects similar to the system disclosed in the Michalke patent as to the connections of the stator and the rotor winding. However the present system provides a constant speed motor for driving one of the motors in the motor system at constant speed so as to operate all the motors synchronously and at contant speed. In a system constructed as above set forth, the load in driving the synchronously operating motors is placed entirely upon the constant-speed propelling motor which drives one of the motors. When the number of synchronously operating motors is large or the load upon them is large trouble may be experienced in holding the propelling motor at constant speed. In view of the trouble experienced in holding the speed of the propelling motor constant the present invention provides means for relieving the propelling motor of a portion of the load carried thereby.

In order to relieve the propelling motor of a portion of the load in a system of the above indicated character, impedance elements which are preferably resistance elements are connected in parallel circuit relation with the rotor windings. The resistance elements operate the motors to develop torque as induction motors running with a large slip, and thereby throwing a portion of the motor load on the polyphase source of current connected to the stators of the synchronously operated motors. The resistance elements may be varied to develop any desired amount of torque by the interlocked motors. If so desired the torque produced by the resistance elements in the stator circuits may be sufficient to cause rotation of the motors.

The term "synchronous" when used in describing the operation of the motors is to be understood as referring to the synchronous operation of the motors with respect to each other and not to the synchronous operation of the motors with respect to the frequency of the source of current.

The single figure in the accompanying drawing is a diagrammatic view of a motor control system constructed in accordance with the invention.

Referring to the drawing a three-phase supply circuit comprising conductors 1, 2 and 3 is connected by a switch 4 to a distributor motor 6 and four motors 7, 8, 9 and 10 which serve to operate recording devices. Although only four motors are shown for operating recording devices it is to be understood that any desired number of said motors may be included in the circuit. The motors 7 and 9 are illustrated as respectively operating cameras 11 and 12 and the motors 8 and 10 are respectively illustrated as operating phonographs 13 and 14.

The distributor 6 comprises a polyphase stator winding 15 and a polyphase rotor winding 16. The rotor of the distributor 6 is connected in any suitable manner as by means of shaft 17 to a propelling motor 18 which may be either an alternating current or a direct current machine. The propelling motor 18 is operated at constant speed by means of a suitable speed control system 19. If the propelling motor is a direct current motor the speed control system is preferably similar to that disclosed in the patent to H. M. Stoller, No. 1,662,085 dated March 13, 1928, and if the propelling motor is an alternating current motor the speed control system is preferably similar to that disclosed in the patent to H. M. Stoller et al. No. 1,662,083, dated March 13, 1928. The motors 7, 8, 9 and 10 are similar in construction to the distributor 6 and operate synchronously in a manner to be described in detail hereinafter. Inasmuch as the motors 7, 8, 9 and 10 are similar in construction and operation only the motor 7 will be described in detail.

The motor 7 comprises a three-phase stator winding 20 and a three-phase rotor winding 21. The rotor of the motor is connected in any suitable manner and by means of a shaft 22 to the camera 11. Switches 23, 24 and 25 are provided for connecting the stator winding 20 to conductors 26, 27 and 28 and for connecting the rotor winding 21 to conductors 29, 30 and 31. The conductors 26, 27 and 28 are connected to the stator winding 15 of the distributor 6 and are connected to the supply conductors 1, 2 and 3 by means of the switch 4. Conductors 29, 30 and 31 are connected to the rotor winding 16 of the distributor 6. Switches 32, 33 and 34 are respectively provided for connecting the stator and rotor windings of the motors 8, 9 and 10 to the conductors 26 to 31 inclusive. Thus, when the switches 23, 24, 25, 32, 33 and 34 are closed, the stator windings of the distributor 6 and the motors 7, 8, 9 and 10 are connected in parallel circuit relation, and the rotor windings of the distributor 6 and the motors 7, 8, 9 and 10 are connected in parallel circuit relation.

Resistance elements 36, 37 and 38 are connected to the conductors 29, 30 and 31 in parallel with the rotor windings of the distributor 6 and the motors 7, 8, 9 and 10. The resistance elements 36, 37 and 38 serve to operate the motors as induction motors and develop torque. The resistance elements may be varied in any suitable manner so as to vary the amount of torque developed by the motors.

Assuming the motors 7, 8, 9 and 10 to be in synchronous position with respect to the distributor 6 and the switches 4 and 5 to be closed, any movement of the distributor 6 will be followed synchronously by the rotors of the motors 7, 8, 9 and 10. The movement of the rotors of the motors is not controlled by the frequency of the current supplied by the conductors 1, 2 and 3 but is controlled solely by the speed of rotation of the distributor rotor. The theory of the operation of motors when so connected is well known and is disclosed in the above mentioned patent to Michalke No. 684,579. Accordingly, a detailed description of the synchronous operation of the motors when thus connected is deemed unnecessary.

In making a moving picture record simultaneously with a sound record it is essential to have the motor operating the moving picture machine operate synchronously with the motor operating the sound recording machine. Moreover, it is desirable to have the motors operating the moving picture machine and the sound recording machine operated at substantially constant speed. In order to obtain operation of the motors at constant speed, the distributor 6 is operated by a propelling motor 18 which is held at constant speed by means of the speed control system 19. If the system is constructed as above set forth without the resistance elements 36, 37 and 38 connected in parallel with the rotor windings of the distributor 6 and the motor windings 7, 8, 9 and 10, all the load of driving the motors will be carried by the propelling motor 18. At times the load carried by the propelling motor may be above its load-carrying capacity and interfere with its constant speed operation. Overloading of the propelling motor 18 would be chiefly effected by increasing the number of recording motors connected to the distributor 6. In order to relieve the propelling motor of a portion of the load carried thereby the resistance elements 36, 37 and 38 are connected in parallel with the rotor windings of the distributor 6 and the recording motors. The resistance elements 36, 37 and 38 serve to operate the motors so that they develop torque as induction motors running with a large slip and thereby throw a portion of the motor load on the polyphase source of current. The resistance elements 36 and 37 may be adjusted to effect movement of the motors or may be adjusted to develop torque insufficient to move the rotors of the motors. However, in either case the speed of the recording motors is controlled absolutely by the distributor 6 and the propelling motor 18.

A switch 5 is provided for disconnecting the resistance elements 36, 37 and 38 from the conductors 29, 30 and 31. When stopping the system the switch 5 is opened at the same time the propelling motor is de-energized and prior to the opening of the switch 4. The switch 4 is held closed at the time of opening the switch 5 and stopping the motor 18 to hold the motors 7, 8, 9 and 10 and the distributor 6 in synchronous position with respect to each other. The switch 4 is opened when the distributor 6 and the motors 7, 8, 9 and 10 have stopped rotating.

Modifications in the system and in the location and arrangement of parts may be made within the spirit and scope of the invention and such modifications are intended to be covered by the appended claims.

What is claimed is:

1. In a motor system, a plurality of polyphase motors having rotor and stator windings, a source of polyphase current connected to said motors, means for connecting said rotor windings together and for connecting said stator windings together whereby movement of one motor effects synchronous movement of all motors, means for rotating one motor at constant speed to rotate all the motors synchronously at constant speed, and means comprising impedance elements connected to certain of the motor windings for operating the motors as induction motors to develop driving torque on each of said motors and insure constant speed operation of the polyphase motors by said motor rotating means.

2. In a motor system, a plurality of polyphase motors having rotor and stator windings, said stator windings being connected in parallel circuit relation to a polyphase source of current and said rotor windings being connected together in parallel circuit relation, means for rotating one of said motors at constant speed to rotate the other motors synchronously at constant speed, and means for placing a portion of the motor load on said supply circuit to insure constant speed operation of the polyphase motors by said motor rotating means.

3. In a motor system, a plurality of three-phase motors having rotor and stator windings, said stator windings being connected in parallel circuit relation to a three-phase source of current and said rotor windings being connected together in parallel circuit relation, means for operating one of said motors to rotate all the motors synchronously at constant speed, and means for controlling the rotor circuits to operate the motors as induction motors and place a portion of the motor load on said source of current so as to insure constant speed operation of the three phase motors.

4. In a motor system, a plurality of three-phase motors having rotor and stator windings, said stator windings being connected in parallel circuit relation to a three-phase source of current and said rotor windings being connected together in parallel circuit relation, means for rotating one of said motors at constant speed to rotate all the motors synchronously at constant speed, and means comprising impedance elements connected in parallel with said rotor windings for causing said motors to develop torque and relieve the motor rotating means of a portion of the load carried thereby so as to insure constant speed operation of the three phase motors.

5. In a motor system, a plurality of polyphase motors having rotor and stator windings, said rotor windings being connected together in parallel circuit relation and said stator windings being connected together in parallel circuit relation, a polyphase source of current connected to one group of said windings, means for rotating one of said motors at constant speed, and resistance elements connected in parallel with the motor windings which are not connected to the source of polyphase current for relieving the motor rotating means of a portion of the load carried thereby to insure constant speed operation of the polyphase motors.

6. In a motor system, a plurality of three phase motors having rotor and stator windings, said stator windings being connected in parallel circuit relation to a three-phase source of current and said rotor windings being connected together in parallel circuit relation, means for rotating one of said motors at constant speed for rotating the other motors synchronously at constant speed, and resistance elements connected in parallel with said rotor windings for placing a portion of the motor load on said source of current so as to insure constant speed operation of the three phase motors by the motor rotating means.

7. In a motor system, a plurality of polyphase motors having rotor and stator windings, a source of polyphase current connected to said motors, said stator windings being connected in parallel circuit relation and said rotor windings being connected in parallel circuit relation, regulated means for operating one of said motors to drive all of said motors synchronously at a predetermined speed, and inpedance elements connected in parallel with the rotor windings to develop a torque for relieving said regulated means of a portion of the load carried thereby and insure constant speed operation of the polyphase motors.

8. In a motor system, a plurality of alternating current motors having rotor and stator windings, a source of alternating current connected to said motors, said stator windings being connected in parallel circuit relation and said rotor windings being connected in parallel circuit relation, impedance elements connected in parallel with the rotor windings to develop a torque, and regulated driving means for operating one of said motors to drive all of said motors synchronously at a predetermined speed, said impedance elements being adjusted to effect operation of the regulated driving means at substantially the midpoint of its load carrying capacity and insure constant speed operation of the alternating current motors by the regulated driving means.

9. In a motor system, a plurality of polyphase motors having rotor and stator windings, said stator windings being connected in parallel circuit relation to a polyphase source of current and said rotor windings being connected together in parallel circuit relation, a propelling motor connected to one of said polyphase motors for operating the polyphase motors synchronously at the same speed, speed control means for governing the propelling motor to operate all the polyphase motors at constant speed, and means for controlling said rotor circuits to operate the polyphase motors as induction motors and place a portion of the motor load on said source of current so as to relieve the propelling motor of a portion of the load and insure constant speed operation of the polyphase motors.

10. In a motor system, a plurality of polyphase motors having rotor and stator windings, said stator windings being connected in parallel circuit relation to a polyphase source of current and said rotor windings being connected together in parallel circuit relation, a propelling motor connected to one of said polyphase motors for operating the polyphase motors synchronously at the same speed, means for governing the propelling motor to operate all the motors at constant speed, and means comprising impedance elements connected in parallel with said rotor windings for causing said motors to develop torque so as to relieve the propelling motor of a portion of the load and insure constant speed operation of the polyphase motors.

11. In a motor system, a plurality of polyphase motors having rotor and stator windings, said stator windings being connected in parallel circuit relation to a polyphase source of current and said rotor windings being connected together in parallel circuit relation, propelling means for operating one of said motors to operate all of said motors synchronously, means for controlling said propelling means to operate said motors at constant speed with precision, and means for controlling said rotor circuits to operate the motors as induction motors and place a portion of the load on said source of current so as to relieve the propelling means of a portion of the load carried thereby and insure constant speed operation of the polyphase motors.

In witness whereof, I hereunto subscribe my name this 18th day of September, 1928.

EDMUND R. MORTON.